United States Patent
Hodohara

(10) Patent No.: US 10,183,621 B2
(45) Date of Patent: Jan. 22, 2019

(54) VEHICULAR IMAGE PROCESSING APPARATUS AND VEHICULAR IMAGE PROCESSING SYSTEM

(71) Applicant: Mitsubishi Electric Corporation, Chiyoda-ku, Tokyo (JP)

(72) Inventor: Norifumi Hodohara, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 323 days.

(21) Appl. No.: 15/153,018

(22) Filed: May 12, 2016

(65) Prior Publication Data

US 2017/0140542 A1    May 18, 2017

(30) Foreign Application Priority Data

Nov. 12, 2015  (JP) .................................. 2015-221773

(51) Int. Cl.
*G06K 9/00*       (2006.01)
*B60R 1/00*       (2006.01)
(Continued)

(52) U.S. Cl.
CPC ............ *B60R 1/00* (2013.01); *G06K 9/00791* (2013.01); *G06K 9/00805* (2013.01);
(Continued)

(58) Field of Classification Search
CPC ........... G06K 9/00671; G06K 9/00791; G06K 9/00805; G06K 9/00825; G06K 9/2054; G06K 9/36; G06K 2009/2045; G06K 2009/363; G06T 3/00; G06T 3/0012; G06T 3/0018; G06T 3/0068; G06T 3/0093; G06T 3/4038; G06T 7/50; G06T 7/536;
(Continued)

(56) References Cited

U.S. PATENT DOCUMENTS 6,714,139 B2 *   3/2004   Saito ....................... G01S 11/12
                                                            340/436
7,161,616 B1 *   1/2007   Okamoto .............. G06T 15/205
                                                            348/148
(Continued)

FOREIGN PATENT DOCUMENTS

JP            3917285 B2     5/2007
JP        2010-244326 A    10/2010
(Continued)

OTHER PUBLICATIONS

Communication dated Oct. 18, 2016 from the Japanese Patent Office in counterpart Application No. 2015-221773.

*Primary Examiner* — Eric Rush
(74) *Attorney, Agent, or Firm* — Sughrue Mion, PLLC; Richard C. Turner

(57) ABSTRACT

A vehicular image processing system and a vehicular image processing apparatus are provided which combine an image from a photographing device for detection of an object forward of a vehicle and an image from a photographing device for parking assistance, thereby enabling detection, in a synthesized image, of an obstacle of which the entirety cannot be captured by each photographing device since the object is located in a region where detection is difficult in the conventional art, for example, the object is located at a short distance from the own-vehicle.

8 Claims, 7 Drawing Sheets

(51) Int. Cl.
*G06T 7/50* (2017.01)
*G06T 7/55* (2017.01)
*G06T 7/70* (2017.01)
*H04N 5/247* (2006.01)
*H04N 7/18* (2006.01)
*G06T 3/40* (2006.01)
*H04N 5/357* (2011.01)
*G06K 9/20* (2006.01)

(52) U.S. Cl.
CPC ........ *G06K 9/00825* (2013.01); *G06T 3/4038* (2013.01); *G06T 7/50* (2017.01); *G06T 7/55* (2017.01); *G06T 7/70* (2017.01); *H04N 5/247* (2013.01); *H04N 5/3572* (2013.01); *H04N 7/181* (2013.01); *B60R 2300/105* (2013.01); *B60R 2300/303* (2013.01); *B60R 2300/304* (2013.01); *B60R 2300/60* (2013.01); *B60R 2300/602* (2013.01); *B60R 2300/802* (2013.01); *B60R 2300/806* (2013.01); *B60R 2300/8093* (2013.01); *G06K 2009/2045* (2013.01); *G06T 2207/10028* (2013.01); *G06T 2207/20212* (2013.01); *G06T 2207/30261* (2013.01); *G06T 2207/30264* (2013.01)

(58) Field of Classification Search
CPC .... G06T 7/55; G06T 7/70; G06T 7/97; G06T 2207/20212; G06T 2207/30248; G06T 2207/30252; G06T 2207/30261; B60R 1/00; B60R 1/002; B60R 1/10; B60R 2300/105; B60R 2300/301; B60R 2300/303; B60R 2300/60; B60R 2300/602; B60R 2300/605; B60R 2300/607; B60R 2300/802; B60R 2300/8033; B60R 2300/8093; G03B 37/00; G03B 37/04

USPC ....... 382/100, 103, 104, 106, 154, 276, 282, 382/284, 291, 293, 294; 348/135, 143, 348/148, 159; 345/629, 634
See application file for complete search history.

(56) References Cited

U.S. PATENT DOCUMENTS

| | | | | |
|---|---|---|---|---|
| 8,390,695 | B2* | 3/2013 | Imanishi | B60R 1/00 348/222.1 |
| 2004/0105579 | A1* | 6/2004 | Ishii | G06K 9/00791 382/154 |
| 2005/0163343 | A1* | 7/2005 | Kakinami | G06K 9/00812 382/103 |
| 2006/0192660 | A1* | 8/2006 | Watanabe | B60R 1/00 340/435 |
| 2007/0041659 | A1* | 2/2007 | Nobori | B60R 1/00 382/284 |
| 2008/0253606 | A1* | 10/2008 | Fujimaki | G06K 9/00805 382/100 |
| 2009/0121851 | A1* | 5/2009 | Abe | G06T 3/4038 382/275 |
| 2009/0122140 | A1* | 5/2009 | Imamura | G06T 7/74 382/106 |
| 2010/0134593 | A1* | 6/2010 | Kakinami | G06K 9/00812 348/43 |
| 2010/0245578 | A1* | 9/2010 | Kakinami | G06K 9/00805 382/190 |
| 2014/0055487 | A1 | 2/2014 | Kiyo et al. | |

FOREIGN PATENT DOCUMENTS

| | | |
|---|---|---|
| JP | 2014-41398 A | 3/2014 |
| JP | 2015-179482 A | 10/2015 |

* cited by examiner

VEHICULAR IMAGE PROCESSING APPARATUS AND VEHICULAR IMAGE PROCESSING SYSTEM

BACKGROUND OF THE INVENTION

Field of the Invention

The present invention relates to a vehicular image processing apparatus using a plurality of cameras, and a vehicular image processing system.

Background Art

Conventionally, for detecting an obstacle located forward of an own-vehicle during driving of the vehicle, a monocular camera having an angle of view that is not so wide but is advantageous in detecting a distant obstacle or a compound-eye camera used also for distance measurement has been used (Patent Document 1).

Meanwhile, for the purpose of parking assistance, an invention has been made in which a plurality of cameras each having a wide angle of view that is advantageous in showing the ground in a wide range are used for photographing the surrounding of an own-vehicle and providing information to a driver, and images captured by these cameras are combined and displayed (Patent Document 2).

CITATION LIST

Patent Document

Patent Document 1: Japanese Patent No. 3917285
Patent Document 2: Japanese Laid-Open Patent Publication No. 2014-41398

Problems to be Solved by the Invention

In detection of an object by a monocular camera, an obstacle such as a pedestrian or a vehicle in front is determined mainly through a camera mounted on a windshield. However, in order to effectively detect a distant obstacle, the camera needs to have a narrow angle to some extent, and in this case, the feet of an obstacle located at a short distance from the own-vehicle cannot fall within the angle of view of the camera.

In addition, even if a wide-angle camera is used, the feet of an object at a short distance are not seen from the camera that is installed on the windshield, since a bonnet projects forward in each of many general vehicles. Thus, with image processing using template matching, a detection rate for such an object decreases or it is impossible to detect such an object.

Even in the case of using a compound-eye camera, similarly to the above-described monocular camera, the feet of an object at a short distance from the own-vehicle cannot fall within the angle of view of the camera, since the camera is installed at the inner side of the windshield. It is possible to measure the distance to the object by the compound-eye camera. However, detection through template matching is required for determining an attribute of the object (whether the object is a pedestrian or a vehicle, etc.), so that, for example, a decrease in detection rate or the like occurs similarly to the above-described monocular camera.

For putting distance measurement with a compound-eye camera into practical use, the optical axes of the compound-eye camera need to be as parallel as possible in order to improve accuracy and simplify a calculation model. That is, since the compound-eye camera is used for the purpose of distance measurement, the photographing areas of the compound-eye camera need to overlap each other as much as possible (although a base line length is also taken into account), so that the photographing areas themselves are almost not different from that in the case of using a monocular camera. In addition, as a matter of course, since the compound-eye camera uses a plurality of cameras, the compound-eye camera has a problem that the cost and a space for installation increase.

Meanwhile, as cameras installed for the purpose of parking assistance, a plurality of cameras are mounted mainly at the outer side of a vehicle so as to be directed downward for photographing the ground around the vehicle, and each have a fisheye lens with which an image can be captured in a wide angle. In the forward direction of the vehicle, the cameras are often mounted around a bumper. Even when these cameras are used, it is possible to detect an obstacle forward of the vehicle. However, since the cameras are installed for the purpose of mainly photographing the ground, if an obstacle is present at a short distance, only the feet of the obstacle fall within the photographing ranges of the cameras, and it is difficult to correctly detect such an obstacle.

Therefore, there is a demand for an image processing system that is able to correctly detect an object around a vehicle even when the object is located at such a position that the object is not entirely captured by a single camera.

SUMMARY OF THE INVENTION

The present invention has been made in order to solve the above-described problems, and an object of the present invention is to provide a vehicular image processing apparatus and a vehicular image processing system that combine an image from a camera for parking assistance and an image from a camera for detection of an object forward of a vehicle, thereby effectively detecting an obstacle the whole body of which cannot be entirely within a camera image since the object is located in an area in which detection is difficult in the conventional art, for example, the object is located at a short distance from the own-vehicle.

Solution to the Problems

A vehicular image processing apparatus of the present invention includes: a receiver for receiving input of a first captured image obtained by photographing an area forward of a vehicle and a second captured image obtained by photographing an area around the vehicle and of which a photographing area partially overlaps that of the first captured image; a projection image converter for performing projective transformation such that the second captured image is captured from the same position as that for the first captured image; a first image combiner for combining an output image of the projection image converter and the first captured image such that the output image and the first captured image are continuous; a detector for detecting an obstacle forward of the vehicle from an image synthesized by the first image combination module; and a transmitter to send an information of the obstacle to a display.

In addition, a vehicular image processing system of the present invention includes: the above vehicular image processing apparatus; a first photographing device, mounted on the vehicle, for photographing an area forward of the vehicle; a second photographing device, mounted on the vehicle and having a photographing area partially overlapping that of the first photographing device, for photographing an area around the vehicle; and a display device for displaying output from the vehicular image processing apparatus.

Effect of the Invention

With the vehicular image processing apparatus of the present invention, a plurality of captured images are combined, thereby making it possible to detect and determine an obstacle that is forward of the vehicle and cannot be entirely contained within a single captured image.

In addition, with the vehicular image processing system of the present invention, images obtained by a plurality of photographing devices are combined, thereby making it possible to detect and determine an obstacle that is forward of the vehicle and cannot be entirely captured by a single photographing device, and display the obstacle to a driver.

DETAILED DESCRIPTION OF THE INVENTION

Embodiment 1

Figure 1:
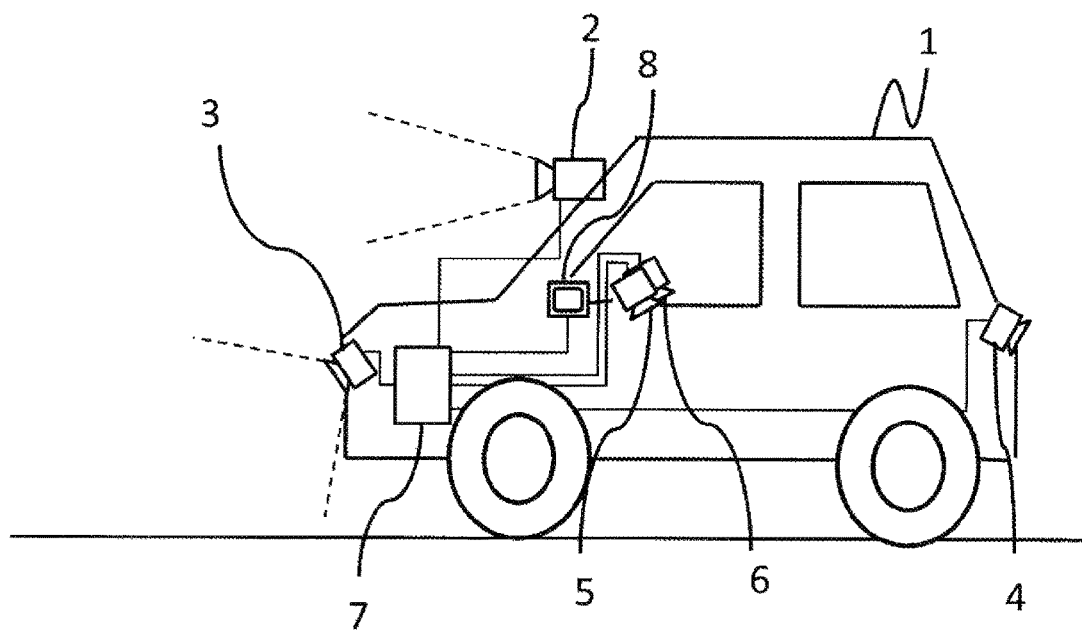
FIG. 1 is a schematic diagram showing a main part of a vehicular image processing system according to Embodiment 1 of the present invention.

FIG. 1 is a schematic diagram showing a main part of a vehicular image processing system that is Embodiment 1 of the present invention. In the drawing, image data from an upper front camera 2, a lower front camera 3, a rear camera 4, a left camera 5, and a right camera 6 that are mounted on a vehicle 1 is subjected to image processing by an image processing apparatus 7 and then displayed on a video display device 8.

The upper front camera 2 includes a lens, an optical sensor, and an image transmission module, and is installed mainly at the vehicle interior side of a windshield of the vehicle 1 and on the lateral center of the back side (windshield side) of a rear-view mirror. The height of the upper front camera 2 from the ground is 1500 mm, and the distance from the vehicle's front end to the upper front camera 2 is 1500 mm.

The upper front camera 2 is installed such that the upper front camera 2 is inclined horizontally relative to the ground, that is, each of angles of pan, tilt, and roll is 0 degree. A lens having a horizontal angle of view of 50 degrees is used in order to allow for photographing a place at a long distance forward of the vehicle. The photographing resolution is 1280 pixels horizontally and 960 pixels vertically. Obtained image data is sent to the image processing apparatus 7 by using a high-speed transmission path of low voltage differential signaling (LVDS) or the like.

Similarly to the upper front camera 2, the lower front camera 3 includes a lens, an optical sensor, and an image transmission module, and is installed mainly at the outer side of the vehicle 1 and on the lateral center around a front bumper. The height of the lower front camera 3 from the ground is 800 mm. In order to be able to photograph the ground in a wide range forward of the vehicle, the camera is mounted so as to be tilted downward at a tilt angle of 30 degrees. As the lens, a fisheye lens having a horizontal angle of view of 180 degrees is used. The photographing resolution is 1280 pixels horizontally and 720 pixels vertically, and obtained image data is sent to the image processing apparatus 7.

Similarly to the lower front camera 3, the rear camera 4, the left camera 5, and the right camera 6 are installed for photographing the ground around the vehicle, the rear camera 4 is installed on an upper portion of a number plate at the rear of the vehicle, and the left camera 5 and the right camera 6 are installed on respective lower portions of sideview mirrors. Each of these cameras is installed with a tilt angle thereof being set downward such that the ground directly below the installation position of the camera is included in the photographing area of the camera. As the lens, a fisheye lens is used similarly to the lower front camera 3, and the photographing resolution is 1280 pixels horizontally and 720 pixels vertically. Obtained image data is sent to the image processing apparatus 7.

Figure 2:
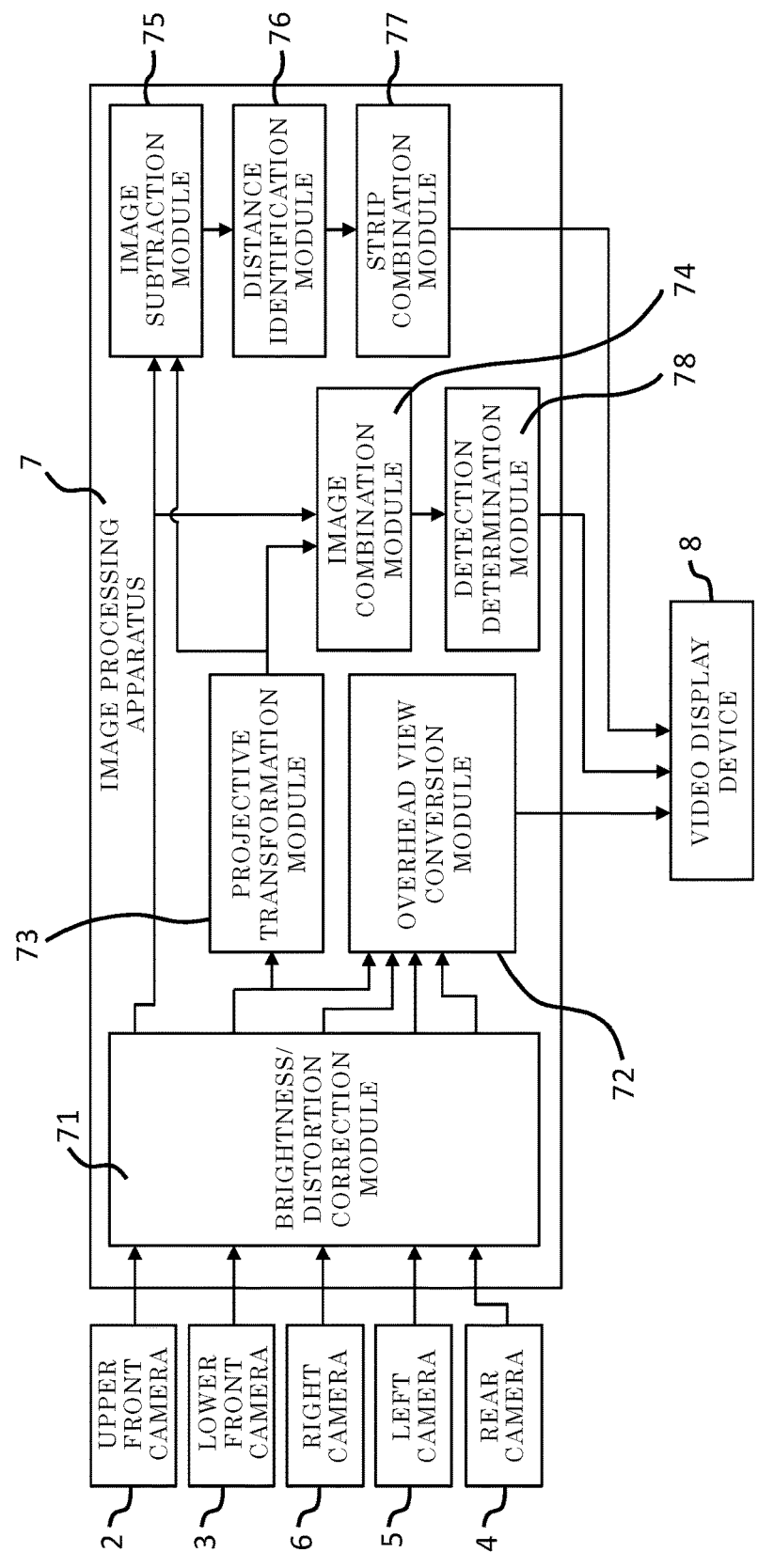
FIG. 2 is a functional block diagram of the vehicular image processing system and a vehicular image processing apparatus according to Embodiment 1 of the present invention.

FIG. 2 is a functional block diagram of the image processing system of the present invention. The image data from each camera is inputted into the image processing apparatus 7, is subjected to image processing, and then is outputted to the video display device 8. The image processing apparatus 7 includes a respective image reception module (not shown), a brightness/distortion correction module 71, an overhead view conversion module 72, a projective transformation module 73, an image combination module 74, an image subtraction module 75, a distance identification module 76, a strip combination module 77, and a detection determination module 78. The role of each module and flow of the image data will be described below.

The image data sent from the above-described five cameras through high-speed transmission is reconstructed from differential signals to parallel signals at the image reception module (not shown), and then is sent to the brightness/distortion correction module 71, and correction for reducing an inter-image brightness difference between each camera and distortion correction suitable for each lens are performed. Among the image data corrected for brightness and distortion, the image data from the lower front camera 3, the rear camera 4, the left camera 5, and the right camera 6 is sent to the overhead view conversion module 72, and the image of each image data is subjected to projective transformation to such a viewpoint as to look down from above the vehicle, and then is combined into a single image such that the ground is naturally connected therein. Furthermore, existing static image data obtained by viewing the vehicle itself from above is superimposed on this single image to obtain image data of a top-view overhead image, and this image data is sent to the video display device 8.

Among the image data corrected for brightness and distortion, the image data from the lower front camera 3 is also sent to the projective transformation module 73 in addition to the above-described overhead view conversion module 72, is subjected to projective transformation with the viewpoint being the same as that of the upper front camera 2, and then is sent to the image combination module 74 and the image subtraction module 75.

The image data from the upper front camera 2 is corrected at the brightness/distortion correction module 71, and then is sent to the image combination module 74 and the image subtraction module 75.

At the image subtraction module 75, the upper front camera image and image data of a projection image group resulting from the transformation at the projective transformation module 73 are compared with each other regarding overlapping portions of the photographing areas. That is, the difference in image therebetween is taken and set as image data of a difference image group, and this image data is sent to the distance identification module 76.

At the distance identification module 76, the difference image group is divided into long strip regions, a distance is identified for each strip region, and labeled information is sent to the strip combination module 77.

At the strip combination module 77, appropriate strip regions are extracted from the image data of the difference image group on the basis of the labeled distance information, and are combined with the image from the upper front camera 2. Image data of a strip-combined image synthesized thus is sent to the video display device 8.

At the image combination module 74, the upper front camera image corrected for brightness and distortion and the image data of the projection image group are combined per distance to create image data of a synthesized image group, and this image data is sent to the detection determination module 78.

At the detection determination module 78, detection using template matching is performed on the image data of the synthesized image group, which is sent from the image combination module 74, to extract an obstacle forward of the vehicle, and information on the obstacle is sent to the video display device 8.

The video display device 8 shows the obstacle determination information obtained from the image processing apparatus 7, to a driver. The video display device 8 includes a liquid crystal display for displaying the overhead image transmitted from the overhead view conversion module 72, the strip-combined image transmitted from the strip combination module 77, and the obstacle information transmitted from the detection determination module 78. Which image or information is to be provided to the driver may be switched by a button operation performed by the driver, or may be automatically switched through judgement based on urgency of information and sensor information such as the speed or steering angle of the vehicle.

A car navigation system or a speed meter panel that is installed near a dashboard that is easily seen by the driver serves as the video display device 8.

The role of each module will be described in detail next.

Figure 3:
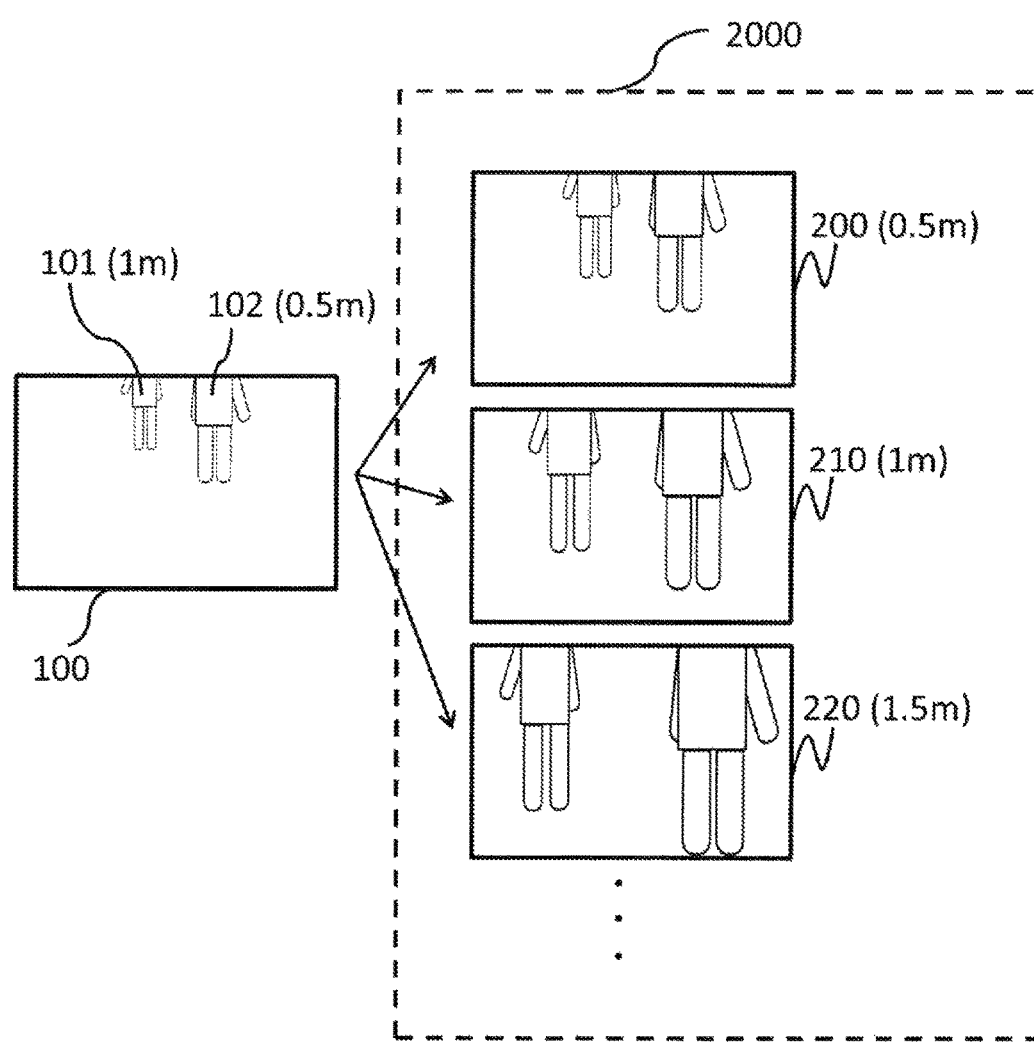
FIG. 3 is a schematic operation diagram of a projective transformation module according to Embodiment 1 of the present invention.

FIG. 3 is a schematic operation diagram of the projective transformation module 73. At the projective transformation module 73, a lower front camera image (hereinafter, referred to as corrected lower image) 100 corrected for brightness and distortion at the brightness/distortion correction module 71 is subjected to projective transformation to create projection images 200, 210, and 220.

A frame located at the left side in FIG. 3 is the corrected lower image 100. Within the frame, two pedestrians 101 and 102 are shown. Since the lower front camera 3 is mounted at a low position and the pedestrians 101 and 102 stand at positions close to the vehicle 1, the upper bodies of the pedestrians 101 and 102 do not fall within the photographing area of the camera, and only the lower bodies of the pedestrians 101 and 102 are shown within the frame. The two pedestrians 101 and 102 are located at positions away from the vehicle 1 by 1 m and 0.5 m, respectively.

To be compared or combined with the image of the upper front camera 2, the corrected lower image 100 is subjected to projective transformation so as to be seen from the same viewpoint as that of the upper front camera 2. The projective transformation is processing of transforming the coordinates of optional four points in the image into other coordinates of four points. When the coordinates of four points shown in the corrected lower image 100, for example, the coordinates of the four corners of a square plate which is not shown, are subjected to projective transformation to the coordinates of the four points of the same object shown in the image of the upper front camera 2, the corrected lower image 100 can be converted to an image that is virtually seen from the same viewpoint as that of the upper front camera 2. However, the mounted positions of the upper front camera 2 and the lower front camera 3 are displaced from each other in the up-down direction and in the front-rear direction, a displacement relative to the image of the upper front camera 2 occurs at locations other a surface on which the projective transformation has been performed (a plane including the square plate in the above example).

Thus, the projective transformation on the corrected lower image 100 is performed at a plurality of surfaces to generate a projection image group 2000 composed of a plurality of projection images. The plurality of surfaces may correspond to a plurality of planes orthogonal to a straightforward axis of the vehicle 1. For example, three frames located at the right side in FIG. 3 are graphic images of the projection images 200, 210, and 220, and are obtained by performing projective transformation on the corrected lower image 100 at planes that are at distances of 0.5 m, 1 m, and 1.5 m forward from the front end of the vehicle 1 and are orthogonal to the optical axis of the upper front camera. The projection images may be created in a wider range or through division at shorter distances. It should be noted that these parameters used for the projective transformation can be calculated beforehand by photographing a square flat target in mounting the camera. Alternatively, the parameters can be calculated from the positions and the orientations of the upper front camera 2 and the lower front camera 3. Image data of the projection image group 2000 composed of the projection images 200, 210, and 220, etc. is sent to the image combination module 74 and the image subtraction module 75.

Figure 4:
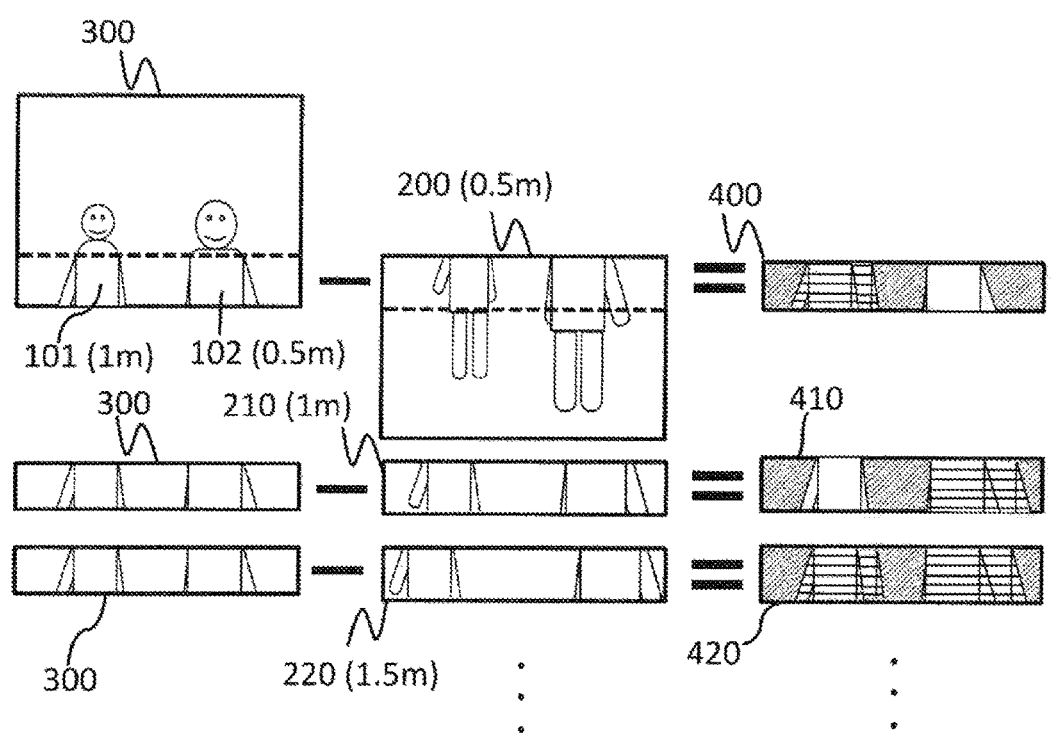
FIG. 4 is a schematic operation diagram of an image subtraction module according to Embodiment 1 of the present invention.

FIG. 4 is a schematic operation diagram of the image subtraction module 75. At the image subtraction module 75, an upper front camera image (hereinafter, corrected upper image) 300 corrected for brightness and distortion at the brightness/distortion correction module 71 is compared sequentially with the above-described projection images 200, 210, and 220 to create a difference image regarding pixel value (brightness).

Prior to the comparison, overlapping portions of the corrected upper image and each projection image are extracted. In FIG. 4, the corrected upper image 300 is shown at the left side, and the projection image group composed of the projection images 200, 210, and 220, etc. is shown at the center. In the projection images, a portion that corresponds to the vicinities of the waists of the two pedestrians and is demarcated by a dotted line overlaps the corrected upper image. When the difference in each pixel between the corrected upper image and the overlapping portion is taken per distance of each projection image, a difference image group is generated which is composed of difference images 400, 410, and 420, etc. shown at the right side in FIG. 4. Here, portions having a small difference are shown in white, and portions having a large difference are schematically shown by horizontal lines. For example, the difference image 400 is obtained by taking a difference between the corrected upper image 300 and the projection image 200 at a point of 0.5 m, and, in the difference image 400, the difference is small in the area of the pedestrian located at 0.5 m, and the difference is large in the area of the pedestrian located at a point of 1 m. This is because the projection image 200 is an image on which the projective transformation has been performed at the surface at 0.5 m forward of the vehicle, and thus the object located at 0.5 m forward of the vehicle has a small displacement from the corrected upper image but a displacement relative to the corrected upper image becomes large at the other locations. The difference image 410 is obtained by taking a difference between the corrected upper image 300 and the projection image 210 at the point of 1 m, and thus, in the difference image 410, the difference is small in the area of the pedestrian located at 1 m, and the difference is large in the area of the pedestrian located at 0.5 m. The difference image 420 is obtained by taking a difference between the corrected upper image and the projection image 220 at a point of 1.5 m, and thus, in the difference image 420, the difference from the corrected upper image is large in the areas of both the pedestrian located at 1 m and the pedestrian located at 0.5 m.

The difference image group composed of the difference images 400, 410, and 420, etc. is sent to the distance identification module 76.

Figure 5:
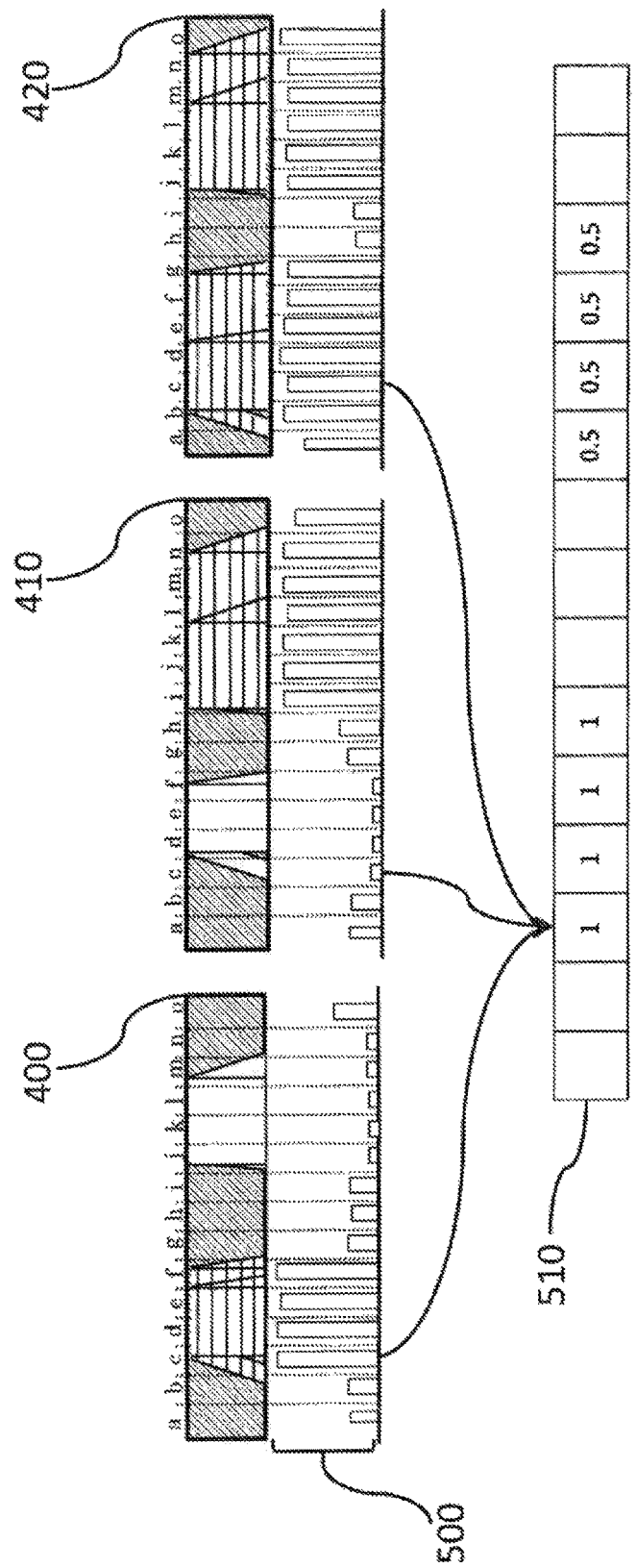
FIG. 5 is a schematic operation diagram of a distance identification module according to Embodiment 1 of the present invention.

FIG. 5 is a schematic operation diagram of the distance identification module 76. At the distance identification module 76, a distance of each area in the image is identified from the difference image generated by the above-descried image subtraction module 75.

First, as shown in FIG. 5, each of the difference images 400, 410, and 420 is divided, for example, into strip regions a, b, c . . . o. For each strip region, an integrated value 500 of pixel values within the region (the value of the difference of each pixel obtained at the image subtraction module 75) is calculated. The integrated values 500 of the corresponding strip regions of the respective difference images are compared with each other, the distance (the distance corresponding to the projection image used for obtaining the difference image) of the difference image including the strip region having the lowest integrated value (the value of the difference is low and the displacement is small) is regarded as the distance of an object present in this strip region, and labeling is performed. For example, in FIG. 5, as a result of comparison of the integrated values 500 of the strip regions c of the respective difference images 400, 410, and 420, the integrated value of the strip region c of the difference image 410 indicates a lowest value, the distance of an object present in this strip region can be identified as 1 m, and thus labeling with 1 is performed. It should be noted that in this labeling, if the integrated value indicating a lowest value is greater than a predetermined threshold, no corresponding distance is considered as being present, and labeling is not performed. Distance label information 510 identified thus is sent to the strip combination module 77.

Figure 6:
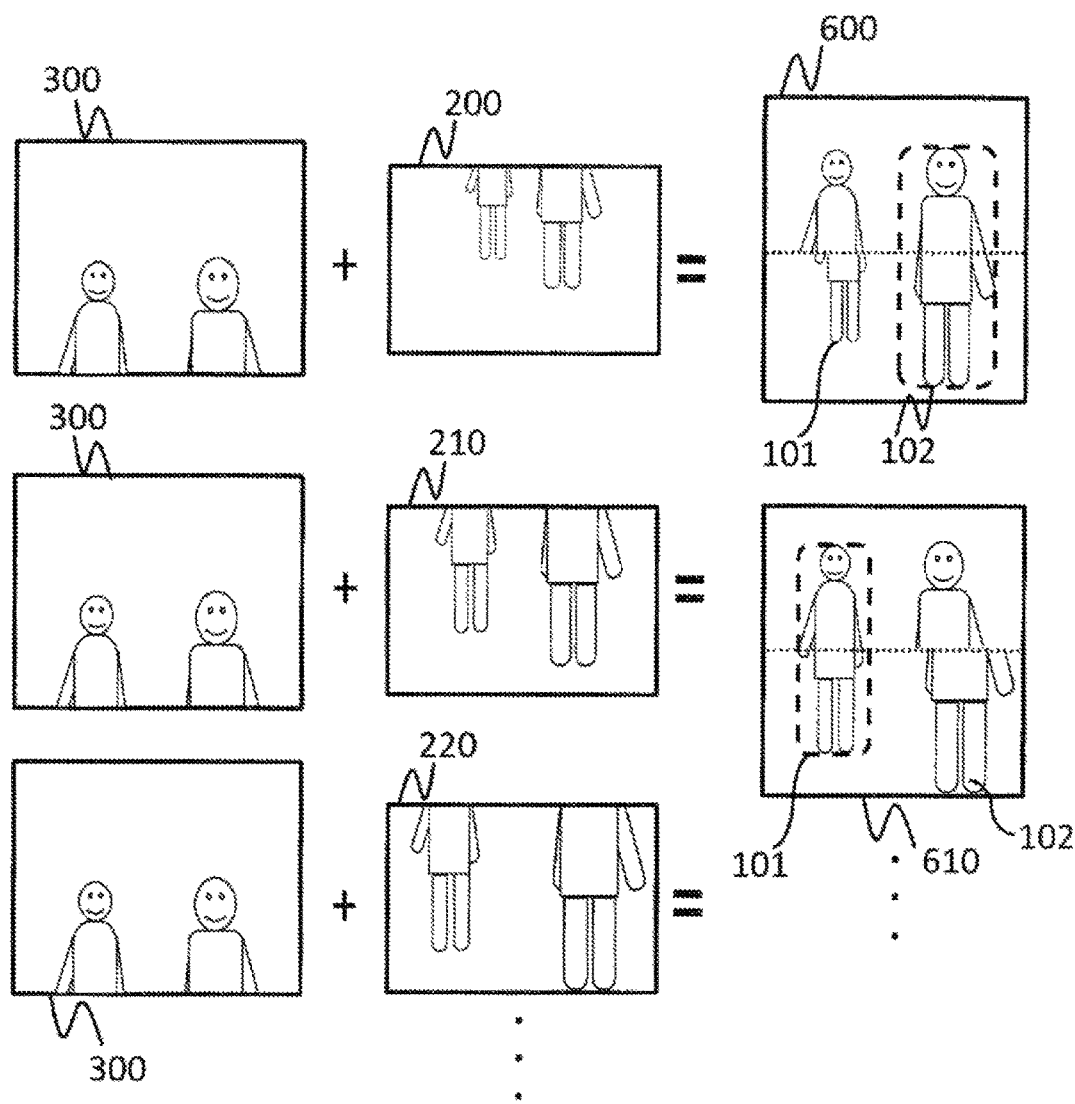
FIG. 6 is a schematic operation diagram of an image combination module and a detection determination module according to Embodiment 1 of the present invention.

FIG. 6 is a schematic operation diagram of the image combination module 74 and the detection determination module 78.

At the image combination module 74, the above-described corrected upper image and projection image group are combined. In FIG. 6, synthesized images 600 and 610 are located at the right side. Here, when the synthesized image 600 obtained by combining the corrected upper image 300 and the projection image 200 corresponding to 0.5 m is seen, a displacement occurs at a boundary line of the combination in the pedestrian 101 located at 1 m from the vehicle 1, the pedestrian 102 located at 0.5 m is combined without any displacement. This is because the projection plane is set at the point of 0.5 m as described above regarding the image subtraction module 75. Similarly, in the synthesized image 610 from the corrected upper image 300 and the projection image 210 corresponding to 1 m, the object present at the point of 1 m is combined continuously without any displacement, and a displacement occurs at the boundary line in the object located at the other distance.

At the detection determination module 78, obstacle detection processing through template matching using characteristic amounts such as histograms of oriented gradients (HOG) is performed on each image of the synthesized image group such as the synthesized images 600 and 610. Here, in the synthesized image 600 corresponding to 0.5 m, the pedestrian 102 located at 0.5 m can be detected, but it is difficult to detect the pedestrian 101 located at 1 m since the shape of the pedestrian 101 is different from the actual shape of the pedestrian due to the displacement at the boundary line. On the other hand, in the synthesized image 610 corresponding to 1 m, detection of the pedestrian 102 at 0.5 m is difficult, but it is possible to detect the pedestrian located at 1 m. Therefore, the corresponding distance of the synthesized image represents the distance of an object that can be detected in this synthesized image, and, on the basis of this distance, it is possible to identify the distance of the detection object.

For object distance measurement, the distance label information 510 obtained at the aforementioned distance identification module 76 may be used. Information on the position, attribute, or the like of the obstacle detected thus is sent to the video display device 8, and a warning against a risk of collision between the vehicle 1 and the obstacle is issued to the driver.

Figure 7:
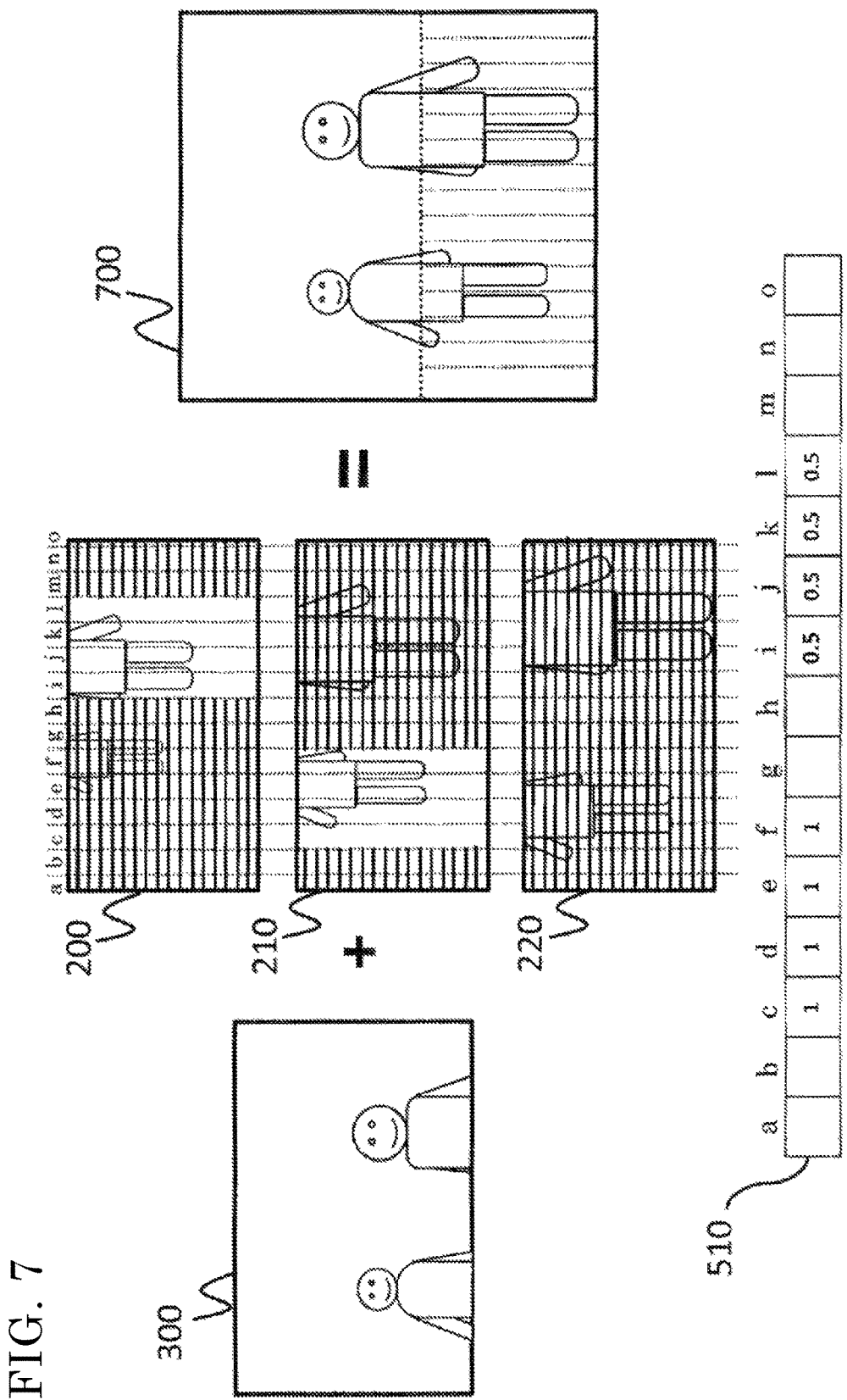
FIG. 7 is a schematic operation diagram of a strip combination module according to Embodiment 1 of the present invention.

FIG. 7 is a schematic operation diagram of the strip combination module 77.

Also at the strip combination module 77, the corrected upper image and the projection image group are combined similarly at the image combination module 74. However, at this time, the projection image group is divided into long strip regions, and a strip region corresponding to the distance label information 510 is extracted and combined with the corrected upper image. For example, as shown in FIG. 7, the strip regions c to f of the projection image 210 are extracted on the basis of the strip regions c to f labeled with "1" in the distance label information 510, the strip regions i to l of the projection image 200 are extracted on the basis of the strip regions i to l labeled with "0.5" in the distance label information 510, and the extracted strip regions are combined with the corrected upper image 300. A strip-combined image 700 synthesized thus is an image obtained by combining the projection image at an appropriate distance per strip region. Thus, in the objects that stand at the points of 0.5 mm and 1 m and are shown in this example, no displacement is present at the boundary line, and the objects are naturally seen by human eyes. The strip-combined image 700 is sent to the video display device 8, and is provided to the driver at appropriate timing by using, for example, the information obtained at the detection determination module 78.

In Embodiment 1 described above, the image data from the lower front camera 3 is subjected to projective transformation at the projective transformation module 73 with the viewpoint of the upper front camera 2, but the image data from both the upper front camera 2 and the lower front camera 3 may be subjected to projective transformation in order to obtain an image from another viewpoint other than the respective viewpoints of the upper front camera 2 and the lower front camera 3. For example, in detecting a paint drawn on a road surface, when both of the captured images of the upper front camera 2 and the lower front camera 3 are subjected to projective transformation with such a viewpoint as to look from above, it is made possible to detect also a paint that is shown in both of the images of the upper front camera 2 and the lower front camera 3.

As described above, the vehicular image processing system according to Embodiment 1 combines the image of the lower front camera 3 to virtually widen the field of view, thereby enabling detection processing to be performed for an obstacle that is present forward of the vehicle and over a range that cannot be captured only by the upper front camera 2 in the conventional art.

Since the image data from both the upper front camera 2 and the lower front camera 3 is subjected to projective transformation, an image from an optional free viewpoint can be synthesized without the viewpoint being fixed on the basis of the mounted positions and the orientations of the upper front camera 2 and the lower front camera 3. In performing the detection processing at the detection determination module 78 or in providing the synthesized image to the driver through the video display device 8, it is possible to select a more appropriate viewpoint, and an image in a wide range that cannot be obtained only from the upper front camera 2 or the lower front camera 3 can be seen.

The lower front camera 3 can have a role in combining the image thereof with the image of the upper front camera 2 to assist in detection of an obstacle at a short distance forward from the vehicle, and also a role as one of cameras used for top-view display intended for parking assistance, and there is an advantage in terms of cost and installation space as compared to the case of preparing separate cameras according to the respective roles.

Even in the case where the mounted positions of the upper front camera 2 and the lower front camera 3 are greatly different and thus a displacement occurs between two images thereof even when the images are subjected to projective transformation with the same viewpoint, since the projection image group composed of the projection images 200, 210, and 220, etc. corresponding to a plurality of predetermined distances is prepared, the synthesized image group composed of the synthesized images 600 and 610, etc. corresponding to these distances can be created, and detection processing is enabled to be performed for an obstacle present at a predetermined distance. In addition, if a certain obstacle extending over both sides of the boundary line of the combination can be detected in the synthesized image corresponding to a certain distance, the obstacle can be considered as being located at the distance corresponding to the synthesized image, and thus it is also possible to identify the distance of the obstacle from the front of the vehicle.

For the overlapping portions of the image of the upper front camera 2 and the respective projection images 200, 210, and 220 of the projection image group, the difference per pixel is calculated, the difference values are integrated and compared per strip-like region, and labeling is performed with the distance of the projection plane corresponding to the strip region having the lowest integrated value, as the distance of this region, whereby it is possible to identify the distances of the overlapping portions from the vehicle 1. Accordingly, the distance to an object can be obtained without performing pattern matching or the like. Furthermore, the distance measurement is not distance measurement based on a disparity using a stereo camera or the like, but uses the projection plane. Thus, it is not necessary to construct a calculation model that is complicated due to differences between the respective cameras in angle of view, the direction of the optical axis, and the position in the front-rear direction, etc.

Since the distance is obtained through division into the long strip-like regions, a portion of the image other than the overlapping portion thereof can be inferred to be at the same distance on the assumption that the obstacle stands on the ground, and, because of this distance information, the natural strip-combined image 700 having a wide field of view and having no displacement can be provided to the driver. Therefore, the driver can see an image including the whole body of the pedestrian, not an image including only the upper body or the lower body of the pedestrian, and thus can make more appropriate assessment of the situation.

It should be noted that, within the scope of the present invention, the above embodiment may be modified or abbreviated as appropriate.

DESCRIPTION OF THE REFERENCE CHARACTERS 1 vehicle
2 upper front camera
3 lower front camera
4 rear camera
5 left camera
6 right camera
7 image processing apparatus
8 video display device
71 brightness/distortion correction module
72 overhead view conversion module
73 projective transformation module
74 image combination module
75 image subtraction module
76 distance identification module
77 strip combination module
78 detection determination module

The invention claimed is:
1. A vehicular image processing apparatus comprising:
a receiver to receive input of a first captured image obtained by photographing an area forward of a vehicle and a second captured image obtained by photographing an area around the vehicle, a photographing area of the second captured image partially overlapping that of the first captured image;
a processor comprising:
a projection image converter configured to perform projective transformation on the second captured image at a plurality of projection planes corresponding to different distances from the vehicle and output a projection image group comprising projection images having been captured from the same position as that for the first captured image,
a first image combiner configured to combine each of the projection images and the first captured image, respectively, such that each output image comprising one of the projection images and the first captured image is continuous, and a detection module configured to detect an obstacle forward of the vehicle from at least one of the output images synthesized by the first image combiner; and a transmitter to send information of the obstacle to a display.

2. The vehicular image processing apparatus according to claim 1, wherein the first image combiner is further configured to output a synthesized image group corresponding to the plurality of projection planes.

3. The vehicular image processing apparatus according to claim 2, wherein the processor further comprises:

an image subtractor configured to calculate a similarity per pixel for overlapping portions of the first captured image and each projection image of the projection image group; and a distance identification controller configured to perform comparison per region and perform labeling with a distance of a projection plane, among the plurality of projection planes, for the projection image corresponding to a most similar region, as a distance of the region.

4. The vehicular image processing apparatus according to claim 3, wherein the processor further comprises:

a second image combiner configured to select the projection image of each labeled region and combine the selected projection image with the first captured image, thereby to perform combination such that a boundary between the selected projection image and the first captured image can be seen as continuous.

5. The vehicular image processing apparatus according to claim 2, wherein the processor further comprises:

an image subtractor configured to calculate a difference per pixel for overlapping portions of the first captured image and each projection image of the projection image group;

a distance identification controller configured to integrate and compare difference values per a strip-like region, and perform labeling with a distance of a projection plane, among the plurality of projection planes, corresponding to the strip-like region having a lowest integrated value, as a distance of the strip-like region; and a strip combiner configured to select the projection image of each labeled strip-like region and combine the selected projection image with the first captured image thereby to perform combination such that a boundary between the selected projection image and the first captured image can be seen continuous.

6. The vehicular image processing apparatus according to claim 1, wherein the first captured image is subjected to the projective transformation.

7. A vehicular image processing system comprising:

a first photographing device mounted on a vehicle and configured to photograph an area forward of the vehicle;

a second photographing device mounted on the vehicle and configured to photograph an area around the vehicle, the area photographed by the second photographing device partially overlapping the area photographed by the first photographing device;

a vehicular image processing apparatus comprising:

a receiver to receive an input of a first captured image obtained by photographing the area forward of the vehicle, from the first photographing device, and a second captured image obtained by photographing the area around the vehicle, from the second photographing device, a photographing area of the second captured image partially overlapping that of the first captured image, and a processor comprising:

a projection image conversion module configured to perform projective transformation on the second captured image at a plurality of projection planes corresponding to different distances from the vehicle and output a projection image group comprising projection images having been captured from the same position as that for the first captured image, a first image combination module configured to combine each of the projection images and the first captured image, respectively, such that each output image comprising one of the projection images and the first captured image is continuous, and a detection determination module configured to detect an obstacle forward of the vehicle from at least one of the output images synthesized by the first image combination module;

and a display device configured to display a result output from the vehicular image processing apparatus.

8. The vehicular image processing system according to claim 7, wherein the second photographing device is further configured to output an overhead image of the vehicle as viewed from above.

* * * * *